June 29, 1965
J. D. SOMERS
3,191,971
HOSE FITTING
Filed Sept. 7, 1961
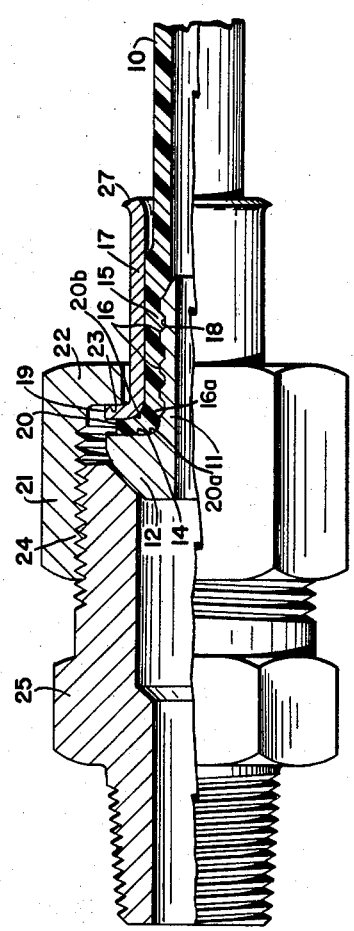
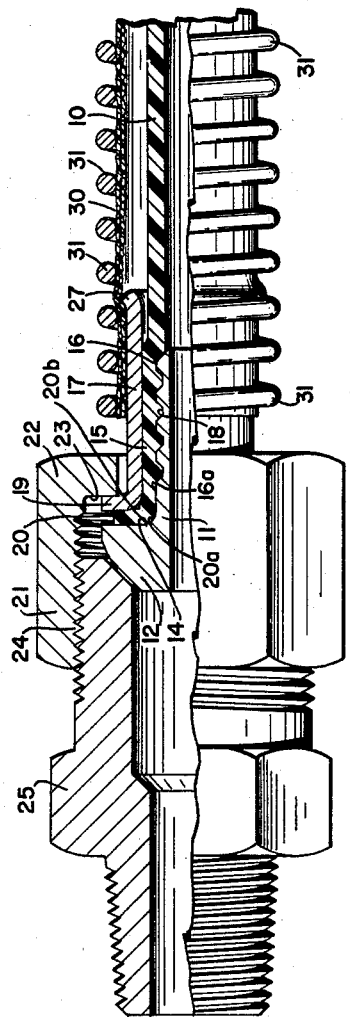
INVENTOR
JOHN D. SOMERS
BY
ATTORNEYS

United States Patent Office 3,191,971
Patented June 29, 1965

3,191,971
HOSE FITTING
John D. Somers, Middlebury, Conn., assignor to Anaconda American Brass Company, a corporation of Connecticut
Filed Sept. 7, 1961, Ser. No. 136,650
2 Claims. (Cl. 285—55)

This invention relates to a re-usable hose fitting for flexible hoses which is constructed to facilitate assembly by hand. The invention further relates to a fitting having projections formed on a stem member of larger diameter than the diameter of the hose which provides a substantially leak proof fit but does not interfere with the ease of assembling the fitting.

This novel fitting is an improvement over fittings of the type which are capable of being assembled without benefit of special tools in that it provides a more positive connection of the parts of the assembly and is therefore less susceptible to bursting, leaking, loosening or blowing off the end of the hose. The relative size relationships and formation of the new fitting contribute to make the fitting easy to assemble and less susceptible to leaking than heretofore known.

The end fitting is designed for use with a flexible hose and includes a stem member having an axial bore extending completely therethrough and is adapted to fit into the end of the hose. The stem member has an outside diameter larger than the inside diameter of the hose, thereby to expand that portion of the hose into which it is fitted. Projections are formed about the outer surface of the stem member. The stem member defines a shoulder at the end thereof opposite that end adapted to fit into the hose. A collar having an inside diameter smaller than the outside diameter of the expanded portion of the hose is adapted to be located in operative position about the stem portion to compress the expanded hose portion therebetween and also to compress a flared endmost portion of the expanded hose portion against the shoulder. Means are provided for retaining the collar in its operative position. In an alternative embodiment the fitting is adapted to be used in a flexible hose assembly of the type having an outer jacket surrounding and spaced from the flexible hose. In this alternative the collar is adapted to be inserted between the flexible hose and outer jacket and is of sufficient thickness to maintain them spaced from each other. The collar has an outwardly flared end portion formed on the end thereof which is adapted to be fitted between the hose and jacket. A spring compressively surrounds the jacket at least along that portion overlying the collar.

Certain advantages are derived from using the new fitting with a soft plastic hose. In assembling the hose, the stem member is inserted into the end of the hose and then the collar is brought forward toward the end of the hose around the expanded portion of the hose. As the collar is forced thereon, the expanded portion is compressed against the stem member and a portion of the hose is axially displaced by the collar causing the endmost portion of the hose to flare radially outwardly against the shoulder. This is rather surprising since it would appear that the annular projections would preclude movement of the hose to flare radially outwardly. Moreover, despite this radial flaring permitted, when the fitting is fully assembled it is precisely these annular projections with portions of the hose compressed therebetween, which contribute to preventing the fluid from forcing a path between the stem and the hose, and subsequent leaking or blowing off of the fitting.

A preferred embodiment of the invention is described hereinbelow with reference to the drawing wherein:

FIG. 1 is a longitudinal elevation partly in section of the new end fitting assembly; and FIG. 2 is a longitudinal elevation partly in section of another embodiment of the fitting assembly.

Referring initially to FIG. 1, the end fitting is shown in a hose assembly of the type having a soft plastic hose 10. The fitting includes a stem member 11 which has an axial bore extending completely therethrough and includes an end portion 12. The stem member 11 is of a smaller outside diameter than the end portion and defines a shoulder 14 with the end portion in a plane perpendicular to the axis of the fitting. The stem member 11 is also of a larger outside diameter than the inside diameter of the hose 10 thereby permitting the stem portion to radially expand a portion 15 of the hose upon insertion internally into the end portion thereof. (One preferred example involved a .040" expansion with a .140" I.D. tube.) Flat annular projections 16 are formed on the stem member 11 for assistance in securely maintaining the stem member within the end of the hose 10.

A substantially cylindrical collar 17, which has an inside diameter slightly smaller than the outside diameter of the expanded portion 15, tightly compresses the expanded portion between itself and the stem member 11. The expanded portion 15 of the hose is thereby compressed into the grooves 18 defined between the annular projections 16 so as to provide a tight fit and prevent the fluid being conveyed by the hose assembly from leaking by forcing a path between the hose 10 and the stem member 11. The compression of the portion 15 of the hose between the annular projections 16 further provides resistance to the axial displacement of the hose, thereby preventing the hose from blowing off the fitting. A flnage 19 is formed on the end of the collar 17 nearest to the shoulder 14, and the endmost portion 20 of the hose is flared radially outward and is compressed between the shoulder 14 and the flange 19. It is to be noted that the stem member 11 has a curved substantially concave interplanar annular surface 20a between the shoulder 14 and the adjacent annular raised portion 16a. The collar 17 has a curved substantially convex interplanar annular surface 20b between the cylindrical collar and its flanged outer end 19.

A nut 21 includes a first portion 22 of reduced inside diameter which fits in rotatable relationship around the collar 17, a shoulder portion 23 defined by the reduction in diameter in a plane perpendicular to the axis of the fitting which is constructed to abut against the flange 19, and a second portion 24 which is internally threaded. The nut 21 is threaded onto a body member 25 which is shown as a double male adapter and is tightened thereon such that the shoulder portion 23 abuts against the flange 19 and compresses the endmost portion 20 of the hose between the flange and shoulder 14. As the nut is tightened, the end portion 12 of the stem member 11 abuts against the adapter 25. It is also to be noted that end 27 of the collar 17, opposite to the end on which the flange 19 is formed, is flared outwardly. This flared end 27 aids in the insertion about the hose and prevents the hose from being damaged by a sharp bending thereof. In assembly the endmost portion 20 of the flared end of the hose which is compressed between the collar and the wall will be guided to its outwardly flared portion by the curved concave interplanar annular surface 20a; and there is a flow of liner into the annular grooves, and the endmost portion of the flared and of the hose is compressed between the flanged annular end 19 and the shoulder 14 is of a smaller cross-sectional thickness than the hose portion compressed between the respective curved interplanar surfaces 20a and 20b.

This end fitting is more than an adequate fitting. A positive compression force maintains a tight seal between the stem member 11 and the collar 17, thereby effecting a tight seal by compressing the hose therebetween against the annular projections 16. Moreover, even if the fluid being conveyed should penetrate between the hose and the stem portion, which is highly unlikely, the endmost portion 20 is confined between the flange 19 and the shoulder 14, thereby providing a second seal to effectively prevent any further fluid penetration.

To assemble the fitting, the collar 17 with the nut 21 mounted thereon, is slipped on soft plastic hose, for example, and is slid along the length of hose for a short distance. The stem member 11 then is inserted internally into the hose causing the edge of the hose to abut against the shoulder 14 and radially expand the portion of the hose overlying the stem member. Since the collar 17 has a smaller inside diameter than the outside diameter of the expanded hose portion, when the collar is forced over this expanded portion 15 it causes a portion of hose to be axially displaced by the collar and further causes the end of the hose to abut against the shoulder and flare radially outward between the shoulder 14 and the flange 19. This is somewhat unexpected since the annular projections 16 would appear to preclude any axial movement of the hose along the stem member 11. Moreover, because of the relative diameter of the collar, stem portion, and the thickness of the hose 10, a relatively strong compression force is exerted on the hose portion between the stem member 11 and the collar 17. Once the collar has been advanced toward the shoulder 14 sufficiently to enable threaded portion 24 of the nut 21 to be threaded onto the female adapter 23 a wrench or some other tool can be used to assist in the assembly of the fitting since tightening of the nut will cause the collar 17 to be advanced toward the shoulder portion 14.

The ease with which the fitting can be assembled is evident from the above description. The fitting can be assembled without the need for special tools. Moreover, the fitting can be removed and re-used since there is no need for any crimping, swaging or deforming of any of the parts. Hence, the new fitting can be field assembled and still provide a substantially leak proof connection of the order ordinarily achieved only by machine assembling.

Referring now to FIG. 2, a second embodiment of the invention is shown. In this embodiment substantially the same fitting is employed on a hose assembly of the type also having an outer jacket 30 which is of a slightly larger diameter than the diameter of the hose 10. In such hoses the outer jacket 30 is an insulating jacket and it is desirable to maintain an air space between the hose and the jacket. In this embodiment the fitting is assembled in the same manner as described above but the collar 17 is inserted between the hose 10 and the outer jacket 30. It is noted that the flaring end 27 of the collar 17 is preferably of a slightly larger diameter than the inside diameter of the jacket 30. Hence the jacket 30 must be forced over the annular flaring end 27. A helical spring 31 which slides freely over the jacket 30 is forced over the projection caused by the flaring end 27 of the collar 19. The projection caused by the flaring end 27 with the jacket 30 overlying this flaring portion has an outside diameter which is larger than the inside diameter of the spring. Moreover, the outside diameter of the collar 17 is preferably slightly larger than the inside diameter of the jacket 30. By means of this construction the spring 31 fits tightly about the jacket 30 and holds the jacket between the spring and the collar 17. The flaring end 17 of the collar prevents the spring 31 from sliding axially along the jacket 30.

Jackets such as this are often formed from a fiber material and are usually included about an inner plastic hose to provide an outer thermal insulation to the heat of the inner hose. It often happened that the jacket 30 would be tightly compressed by crimping, or swaging a sleeve about the jacket to secure the jacket thereon. Such a tight compression of the jacket tended to soften the strands of the fiber material and often caused them to become welded together at elevated temperatures. The present fitting construction maintains the jacket on the collar 17 by a compression force which is adequate to hold the jacket 30 thereon but not of such high compression force that it would tend to soften the strands.

I claim:

1. An end fitting assembly for use with a flexible hose, comprising a stem member having an axial bore extending completely therethrough, a shoulder portion formed on one end portion of the stem member by an increase in diameter thereof and annular projections of equal diameter formed along the opposite end portions thereof and annular grooves defined between the annular projections, a curved substantially concave interplanar annular surface between the shoulder portion and the adjacent annular raised portion, the diameter of said annular projections being larger than the inside diameter of said hose so that insertion of the end portion of the stem member having the annular projections thereon into an end portion of the hose radially expands the hose end portion, a substantially cylindrical collar having a larger inside diameter than the diameter of the annular projections to define an annular cavity therebetween which is smaller in thickness than the cross-sectional thickness of said hose, said collar in its assembled position being mounted substantially concentrically about the projections of said stem member to compress the hose radially and axially therebetween with said collar and stem member being free from radial deformation, said collar having an outwardly flanged annular portion at one of its ends which is positioned opposite said shoulder in the assembled position and a curved substantially convex interplanar annular surface between the cylindrical collar and said flanged outer end, an endmost portion of said hose being caused to cold flow between said shoulder and collar to thereby form an outwardly extending flare, said flare being axially compressed between the respective curved interplanar surfaces of the collar and stem member, and means for retaining said collar in an axially fixed position relative to said stem member, whereby in assembly the endmost portion of the hose will be guided to its outwardly flared position by said curved concave interplanar annular surfaces and there is cold flow of the hose into the annular grooves and the endmost portion of the flared end of the hose compressed between the flanged annular end of the hose and the shoulder is of a smaller cross-sectional thickness than the hose portion compressed between the respective curved interplanar surfaces.

2. An end fitting assembly as in claim 1 for use on a flexible hose assembly of the type having an outer jacket surrounding and spaced from the flexible hose wherein said collar is insertable between the flexible hose and outer jacket, said collar being of sufficient cross-sectional thickness to maintain said hose and outer jacket spaced from each other, said collar having an outwardly flared end portion on the opposite end thereof to be inserted between the hose and the jacket, and means compressively surrounding the jacket at least along that portion overlying the collar for holding the jacket to the collar.

References Cited by the Examiner

UNITED STATES PATENTS

| | | | |
|---|---|---|---|
| 735,735 | 8/03 | Feust | 285—149 X |
| 910,104 | 1/09 | Witzenmann | 285—149 |
| 969,216 | 9/10 | Stephens. | |
| 1,836,986 | 12/31 | Paasche | 285—114 |
| 2,230,115 | 1/41 | Kreidel | 285—248 |
| 2,333,612 | 11/43 | Zimmer. | |
| 2,414,789 | 1/47 | Anderson | 285—248 |
| 2,787,289 | 4/57 | Press | 285—149 X |
| 2,809,056 | 10/57 | Kaiser | 285—149 |
| 2,991,093 | 7/61 | Guarnaschelli | 285—149 X |
| 3,008,736 | 11/61 | Samiran | 285—149 |

FOREIGN PATENTS 1,263,653  5/61  France.

CARL W. TOMLIN, *Primary Examiner.*